(12) United States Patent
Hontele

(10) Patent No.: US 9,137,865 B2
(45) Date of Patent: Sep. 15, 2015

(54) DRIVER FOR A SOLID STATE LAMP

(75) Inventor: Bertrand Johan Edward Hontele, Breda (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 151 days.

(21) Appl. No.: 13/512,409

(22) PCT Filed: Nov. 30, 2010

(86) PCT No.: PCT/IB2010/055502
§ 371 (c)(1),
(2), (4) Date: May 29, 2012

(87) PCT Pub. No.: WO2011/070480
PCT Pub. Date: Jun. 16, 2011

(65) Prior Publication Data
US 2012/0235594 A1    Sep. 20, 2012

(30) Foreign Application Priority Data

Dec. 8, 2009   (EP) .................................. 09178333

(51) Int. Cl.
*H05B 41/16*   (2006.01)
*H05B 33/08*   (2006.01)
*H05B 39/08*   (2006.01)

(52) U.S. Cl.
CPC ............ *H05B 33/0815* (2013.01); *H05B 39/08* (2013.01); *Y02B 20/19* (2013.01); *Y02B 20/383* (2013.01)

(58) Field of Classification Search
CPC ...................................................... H05B 41/16
USPC ....... 315/247, 209 SC, 227 R, 287, 300, 291; 323/300
See application file for complete search history.

(56) References Cited

U.S. PATENT DOCUMENTS

| 40,843 A | 12/1863 | Lambert |
| 4,320,326 A * | 3/1982 | Banziger et al. ............. 315/307 |

(Continued)

FOREIGN PATENT DOCUMENTS

| EP | 0053896 A1 | 6/1982 |
| JP | 2004327152 A | 11/2004 |

(Continued)

OTHER PUBLICATIONS

Author: Disclosed Anonymously, Title: Compatibility of LED Lamps with Phase-Cut dimmers; Date: Apr. 22, 2010.*

(Continued)

*Primary Examiner* — Douglas W Owens
*Assistant Examiner* — Wei Chan
(74) *Attorney, Agent, or Firm* — Yuliya Mathis

(57) ABSTRACT

A driver (32) for a solid state lamp (31) receives phase-cut AV supply voltage (PCACV). The lamp is operated at a dimmed light output (LA) on the basis of the phase angle ($\phi$) of the phase-cut AV supply voltage (PCACV). The driver comprises a memory (39) containing information defining a function (F). In a normal mode, the driver monitors the supply voltage and calculates the momentary value of the dim factor ($\beta$) from the momentary value of the phase angle ($\phi$) according to a formula $\beta=F(\phi)$. In a learning mode, the driver detects the lowest value ($\phi$MIN) and the highest value ($\phi$MAx) assumed by the phase angle ($\phi$), and updates the said information in said memory (39) such that the dim factor will have its minimum value and maximum value ($\beta_{MIN}$, $\beta_{MAx}$) corresponding to the minimum value and maximum value ($\phi_{MiN}$, $\phi_{MAX}$) of the phase angle ($\phi$), respectively.

20 Claims, 3 Drawing Sheets

(56) References Cited

U.S. PATENT DOCUMENTS

| | | | |
|---|---|---|---|
| 4,870,665 A * | 9/1989 | Vaughn | 327/114 |
| 6,900,599 B2 * | 5/2005 | Ribarich | 315/247 |
| 7,215,086 B2 * | 5/2007 | Maxik | 315/247 |
| 7,321,203 B2 * | 1/2008 | Marosek | 315/247 |
| 7,352,134 B2 * | 4/2008 | Ballenger et al. | 315/209 SC |
| 8,018,172 B2 * | 9/2011 | Leshniak | 315/194 |
| 8,102,167 B2 * | 1/2012 | Irissou et al. | 323/300 |
| 8,536,794 B2 * | 9/2013 | Melanson et al. | 315/291 |
| 2004/0095266 A1 * | 5/2004 | Kernahan et al. | 341/165 |
| 2004/0100205 A1 * | 5/2004 | Takahashi et al. | 315/248 |
| 2006/0214603 A1 * | 9/2006 | Oh et al. | 315/246 |
| 2007/0085522 A1 * | 4/2007 | Mariani et al. | 323/284 |
| 2008/0180036 A1 * | 7/2008 | Garrity et al. | 315/227 R |
| 2008/0203932 A1 * | 8/2008 | Ball | 315/189 |
| 2008/0224631 A1 * | 9/2008 | Melanson | 315/291 |
| 2009/0160627 A1 * | 6/2009 | Godbole | 340/310.11 |
| 2009/0251062 A1 * | 10/2009 | Hagino et al. | 315/276 |
| 2010/0214603 A1 * | 8/2010 | Tamura | 358/1.15 |
| 2010/0259183 A1 * | 10/2010 | Leshniak | 315/287 |
| 2010/0308742 A1 * | 12/2010 | Melanson | 315/224 |
| 2013/0241441 A1 * | 9/2013 | Myers et al. | 315/307 |
| 2013/0278159 A1 * | 10/2013 | Del Carmen et al. | 315/200 R |
| 2013/0320882 A1 * | 12/2013 | Gaknoki et al. | 315/307 |

FOREIGN PATENT DOCUMENTS

| | | |
|---|---|---|
| JP | 2008053181 A | 3/2008 |
| JP | 2009026544 A | 2/2009 |
| WO | 9605712 A1 | 2/1996 |

OTHER PUBLICATIONS

Archana Santosh; "Square D Lighting Control and Integrated Home Systems", Nov. 2007, Products Guide, First Edition, pp. 1-127.

AN10754_1, "SSL2101 Dimmable Mains LED Driver", NXP Semiconductors, Jan. 30, 2009, pp. 1-39.

* cited by examiner

DRIVER FOR A SOLID STATE LAMP

FIELD OF THE INVENTION

The present invention relates in general to the field of lighting.

BACKGROUND OF THE INVENTION

For the purpose of illumination, for instance in residential houses, it has been known for a long time to use incandescent lamps that are supplied by a mains circuit; in Europe, the mains circuit typically carries 230 V AC at 50 Hz. A big problem with incandescent lamps is the fact that they convert only a small portion of the available electrical energy into light energy: much energy is consumed and wasted in the form of heat. Thus, there has been and still is a development towards using more efficient lamps, for instance gas discharge lamps but particularly solid state lamps such as LEDs. It even is desirable to replace incandescent lamps by solid state lamps in an existing situation. Solid state light sources such as LEDs need to be driven by an electronic driver, which receive the mains supply voltage and generate an output lamp current. This may be a separate device, but LED lamp units have conveniently been developed in which the LED light source and electronic driver are integrated. Particularly, the present invention relates to such integrated solid state lamps units capable of replacing existing incandescent lamps.

Incandescent lamps have a nominal rating, for instance 60 Watt, 100 Watt, etc, which corresponds to the lamp current when driven by mains voltage, and which corresponds to a certain amount of light emitted by the lamp. Likewise, LEDs have a nominal rating, corresponding to a nominal lamp current. In some circumstances, it is desirable to be able to reduce the amount of light emitted by the same lamp. For this purpose, dimmers have been developed. For the case of LEDs, the electronic driver has a dim function, in which the output lamp current is regulated. Also, specifically with a view to incandescent lamps, electronic mains dimmers have been developed, operating on the basis of phase cutting. Since phase cutting dimmers are commonly known, a discussion thereof will be omitted here. It is noted that such dimmers can be implemented as wall-mounted dimmers, so that a lamp supply voltage would always be a "dimmed" supply voltage.

A complication exists if a dimmable LED lamp unit is to be coupled to an outlet supplied by such mains dimmer, for instance because a dimmed incandescent lamp is to be replaced by a dimmable LED lamp unit. In a dimmable LED lamp unit, the driver expects to be supplied by normal mains voltage and to receive a control signal indicating the desired dim level, and the driver outputs a regulated lamp current in response to such control signal. Such driver would now receive phase-cut mains voltage as supply. So on the one hand the electronic LED driver needs to function properly when receiving phase-cut mains voltage as supply. On the other hand, the phase-cut mains voltage contains dim information, in the form of the phase angle, relating to the dim level desired by the user, and the electronic LED dimmer needs to be capable to use this information as user control input, to read this dim information, and to regulate the output current for the LED lamp accordingly. Such dimmers are known per se.

SUMMARY OF THE INVENTION

While electronic dimmers for LED lamps are known that are capable of operating properly when receiving phase-cut mains voltage as supply, as mentioned above, it is a practical problem that there are several types of mains dimmers, and the LED dimmer does not know in advance which mains dimmer it is going to be connected to. Further, even between mains dimmers of the same type, different specimens can have different properties due to manufacture tolerances, and even the properties of one single specimen may vary over time caused for instance by ageing or varying temperature. One important property of a mains dimmer in this respect is the variation range of the phase angle: when the user actuation knob is in the position "minimum", it may very well be that the phase angle has a finite value $\phi_{MIN}$ larger than zero, and when the user actuation knob is in the position "maximum", it may very well be that the phase angle has a value $\phi_{MAX}$ smaller than 180°. Even small variations in these values $\phi_{MIN}$ and $\phi_{MAX}$ may lead to noticeable differences in the minimum light output and maximum light output of the LED lamp unit concerned.

The present invention aims to solve this inconvenience.

To this end, a driver for a solid state lamp according to the present invention is capable of operating in a learning mode, in which it will detect the minimum phase angle $\phi_{MIN}$ and the maximum phase angle $\phi_{MAX}$ of the supply voltage, and in which it will adapt its own settings so that its own minimum output power is set when the input voltage has the minimum phase angle $\phi_{MIN}$ and its own maximum output power is set when the input voltage has the maximum phase angle $\phi_{MAX}$.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1A:
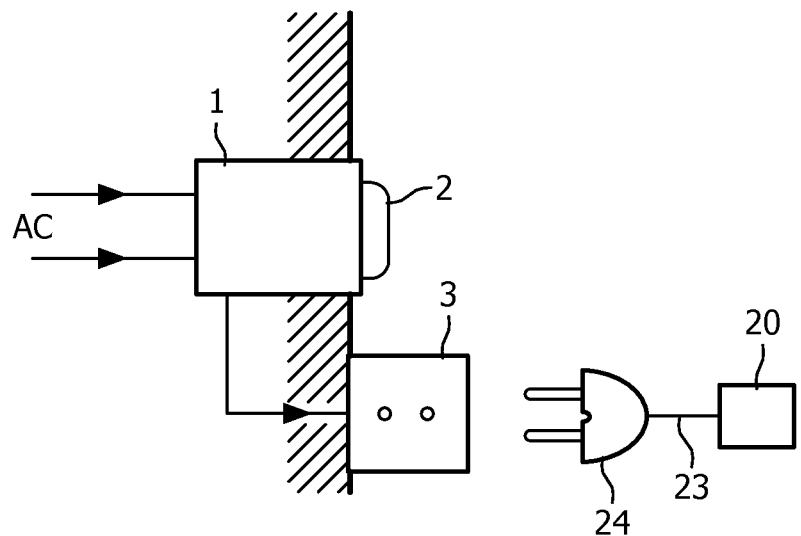
FIGS. 1A and 1B are block diagrams schematically illustrating examples of an illumination set up with a wall-mounted mains dimmer.
Figure 1B:
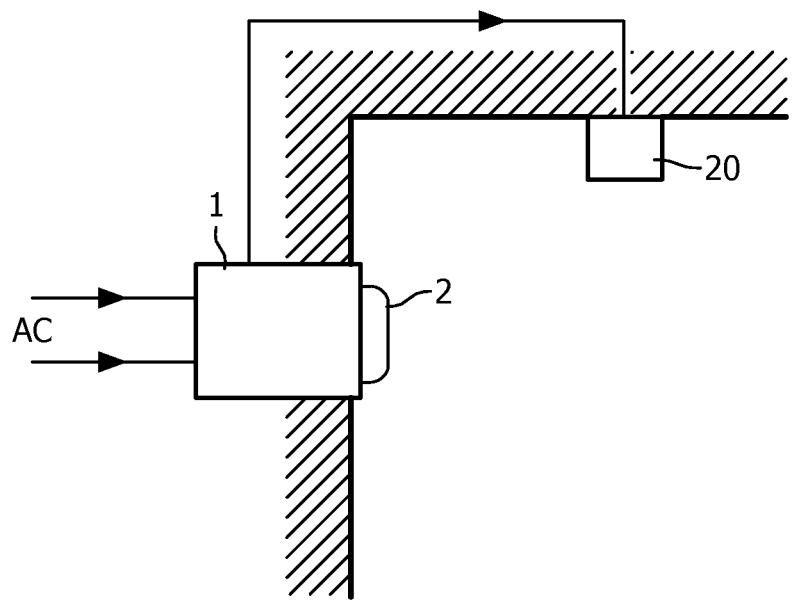

FIG. 1A is a block diagram schematically illustrating one possible example of an illumination set up with a wall-mounted mains dimmer 1, and FIG. 1B is a similar block diagram of another example. In both cases, the dimmer 1 receives AC mains (Europe: 230V@50 Hz) as an input voltage and outputs phase cut AC as an output voltage. A user can control the dimmer 1, for instance by rotating a control knob 2, which will cause the dimmer 1 to change the setting of the phase where the AC voltage is cut. In the example of FIG. 1A, there is a mains socket 3 connected to the dimmer output, and a lamp armature 20 is provided with an electrical cord 23 terminating in a connector 24 to be plugged into the mains socket 3. In the set up of FIG. 1B, the lamp armature 20 is connected to the dimmer output directly. In both cases, the armature 20 is supplied through the electronic dimmer 1, i.e. it only receives phase cut AC voltage, indicated as PCACV.

Figure 2:
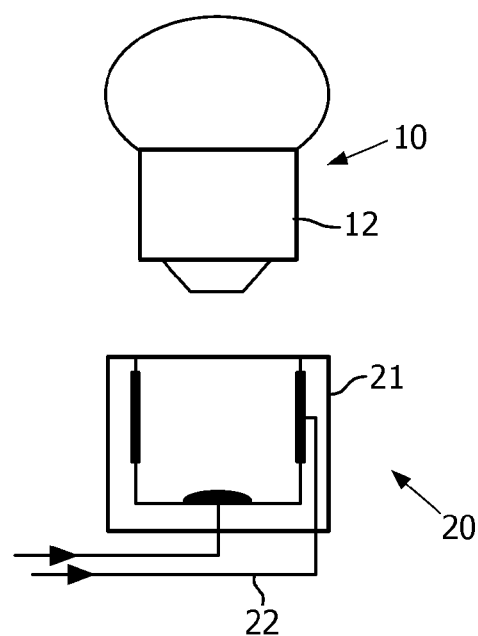
FIG. 2 is a diagram schematically illustrating more details of a lamp armature.

FIG. 2 illustrates, that the armature 20 may comprise a lamp socket 21 for mechanically receiving and holding a lamp foot 12 of a light bulb 10, and for electrically connecting the lamp foot 12 to wiring 22 of the armature 20.

Figure 3A:
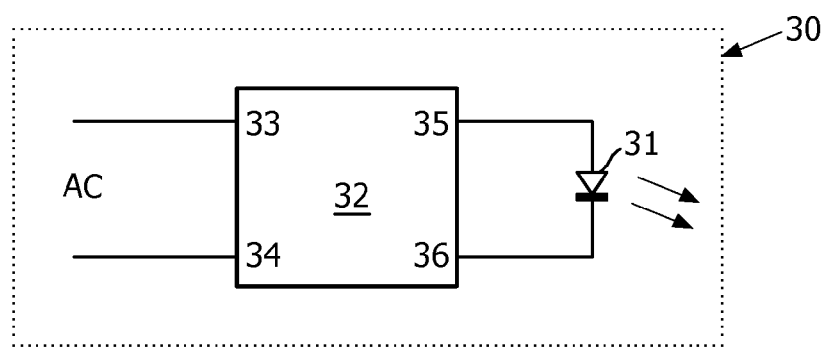
FIG. 3A is a block diagram schematically illustrating a LED lamp unit.

FIG. 3A is a block diagram schematically illustrating an LED lamp unit 30, comprising at least one solid state lamp 31, for instance a LED light source element, and an LED driver 32 having supply input terminals 33, 34 for receiving mains voltage and having output terminals 35, 36 for providing output LED current to the LED light source element 31.

Figure 3B:
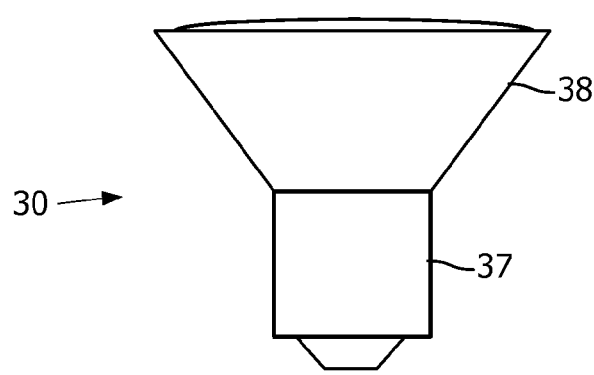
FIG. 3B schematically illustrates a possible physical embodiment of a LED lamp unit, capable of replacing an in candescent light bulb.

FIG. 3B schematically illustrates a preferred physical implementation of an LED lamp unit 30 according to the present invention, comprising a first housing part 37 housing the driver electronics circuitry 32 and designed for cooperating with an armature's lamp socket 21, and a second housing part 38 accommodating the one or more LED light source elements.

When the LED lamp unit 30 is mounted in the armature 20, the LED driver 32 receives phase cut AC voltage PCACV at its supply input terminals 33, 34. This lamp driver 32, while designed for receiving full AC voltage as explained above, should be capable of operating in a dimming mode when receiving the phase-cut AC voltage PCACV. In this dimming mode, the LED driver 32 is designed to provide dimming facility such as to dim the associated LEDs, i.e. it provides a suitable output voltage or current for its associated LEDs in response to the phase angle of the input supply voltage.

Typically, solid state lamps should be driven at a certain nominal lamp current, even when being dimmed, and this is typically implemented by using the so-called duty cycle method: at a relatively high frequency, higher than noticeable by the human eye, the lamp is switched on and off, and the average light output is determined by the ratio of the duration of the on periods to the off periods. Since such duty cycle method is known per se, a further explanation will be omitted here. Further, electronic dimmers capable of the above describe functions are known per se, so a more detailed explanation of design and operation of such dimmers is omitted here.

It is important to realize that the electronic dimmer 32 is designed as a dedicated dimmer for the associated lamp 31, so that its output voltage and/or output current meet the requirements of the specific lamp 31. In the following, it will be assumed that the lamp 31 has a certain nominal rating corresponding to operation at a constant current of a certain nominal current magnitude. Although it would be possible to increase the lamp current somewhat above this nominal current level, this nominal design current rating will be taken as a 100% level and will be indicated as $I_N$. Likewise, the corresponding nominal lamp power will be indicated as $P_N$, and the corresponding light output will be indicated as $L_N$.

When dimming the lamp 31, the output voltage and current should be such that the actual light output $L_A$ is lower than the nominal light output $L_N$. The ratio $L_A/L_N$ will be indicated as the dim level $\beta$. Ideally, $\beta$ can be varied between 0 and 1. In practice, it may be that there is a certain practical minimum dim level $\beta_{MIN}>0$ and that there is a certain practical maximum dim level $\beta_{MAX}<1$.

It is important to realize that the electronic dimmer 32 is designed to calculate the actual dim level $\beta$ for the lamp 31, and, corresponding therewith, the settings for lamp voltage and/or lamp current, on the basis of the dim information in the phase-cut AC input voltage PCACV. This dim information is typically available in the form of a phase angle, which will be indicated as $\phi$, and theoretically this phase angle $\phi$ can vary between 0° and 180°, referring to the AC mains period. Thus, the electronic dimmer 21 is provided with a function F to calculate the output dimming level $\beta$ from the received input information $\phi$. This can be expressed as follows:

$$\beta = F(\phi)$$

The function can be provided in several ways. For instance, the function may be provided as a formula, or as a look-up table. The precise details of this function may depend on the characteristics of the lamp L3. In an illustrative example, this function is a linear function. In any case, information defining this function is stored in a memory 39 of the dimmer 32.

Figure 4A:
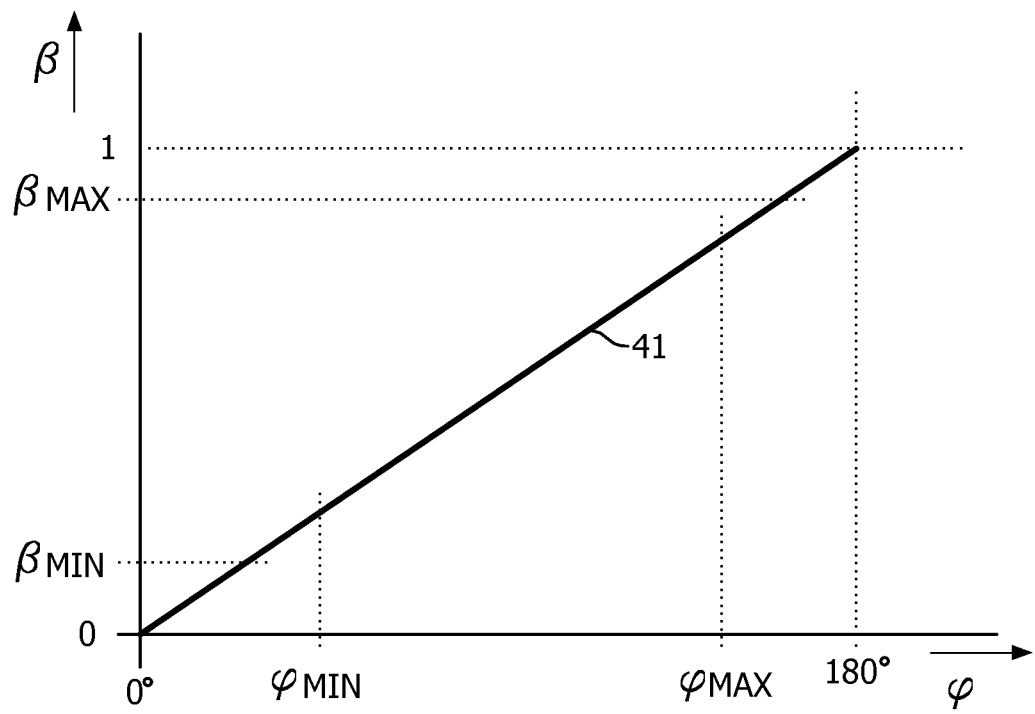
FIG. 4A is a graph schematically illustrating a relationship between phase cutting angle and dim level.

FIG. 4A is a graph with a curve 41 illustrating a possible relationship F between phase cut angle $\phi$ (horizontal axis) and output dimming level $\beta$ (vertical axis) for an ideal case where the phase cut angle $\phi$ can be varied over the complete range from 0° to 180° and where the output dimming level $\beta$ can be varied over the complete range from 0 to 1. In the illustrative case of a linear function, curve 41 is a straight line from point [0°, 0] to point [180°, 1]. In such case, function F can be written as $F(\phi)=\alpha\cdot\phi$, with $\alpha=1/180°$. Normally, however, the relationship is not linear, in order to take account of the sensitivity characteristics of the human eye, as should be clear to a person skilled in the art.

In practice, however, it may be that the mains dimmer is only capable of varying the phase cut angle $\phi$ within a range from a minimum value $\phi_{MIN}$ to a maximum value $\phi_{MAX}$, which values are not known to the LED driver 32. Further, it may be that the LED driver 32 is only capable of varying the dimming level $\beta$ within a range from a minimum value $\beta_{MIN}$ to a maximum value $\beta_{MAX}$, which values are considered to be fixed and known to the driver.

According to the present invention, the LED driver 32 is capable of operating in a learning mode. Entering into this learning mode is done on the basis of a specific command code contained in the supply voltage received by the driver 32. Thus, according to the present invention, during normal operation, the driver 32 is designed to monitor the supply voltage received at its input terminals 33, 34 to detect the specific command code, and to enter its learning mode on detection of the specific command code. This monitoring may be done continuously or at predetermined time intervals. Suitably, the specific command code is a code that can be generated by a user through actuation of the mains dimmer 1. In order to prevent the driver 32 from erroneously entering its learning mode, said command actuation should preferably be of a type not normally done during normal use. In a possible implementation, the command actuation involves a rapid sequence of alternating maximum and minimum settings of the phase angle $\phi$, for instance 3 cycles within 10 seconds.

The driver 32 may be designed to remain in its learning mode for a predetermined length of time, for instance 15 seconds since entering the learning mode. Alternatively, the driver 32 may be designed to exit its learning mode on detection of another specific command code in the supply voltage received at its input terminals 33, 34. In a conveniently simple embodiment, such command code involves the phase angle $\phi$ remaining constant for a predetermined length of time, for instance 15 seconds.

While operating in its learning mode, the driver 32 continues to monitor the supply voltage received at its input terminals 33, 34, and particularly to monitor the momentary value of the phase angle $\phi$. The driver 32 detects the lowest value assumed by the phase angle $\phi$, which will be stored in a first memory location as minimum $\phi_{MIN}$, and detects the highest value assumed by the phase angle $\phi$, which will be stored in a second memory location as maximum $\phi_{MAX}$. The driver 32 continuously compares the detected momentary value of the phase angle $\phi$ with the value $\phi_{MIN}$ in the first memory location, and replaces this value by said momentary value if lower. Likewise, the driver 32 continuously compares the detected momentary value of the phase angle $\phi$ with the value $\phi_{MAX}$ in the second memory location, and replaces this value by said momentary value if higher.

Figure 4B:
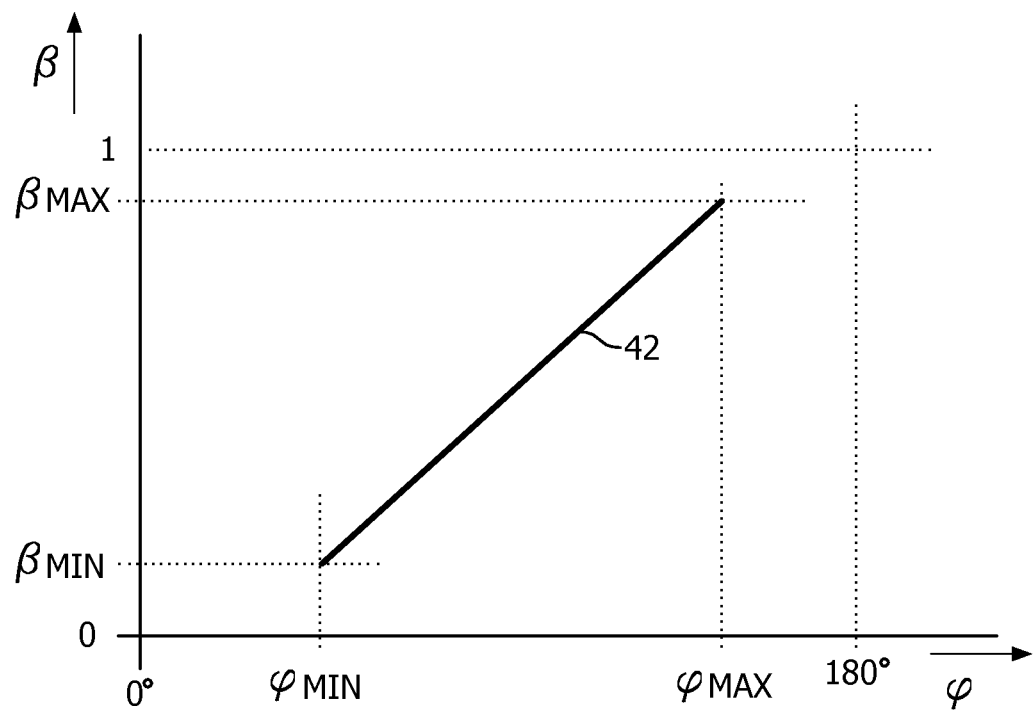
FIG. 4B is a graph comparable to FIG. 4A, when the relationship has been optimized according to the present invention.

When exiting the learning mode, the driver 32 adapts the information in said memory 39 defining said function F, in such a way that $F(\phi_{MIN})=\beta_{MIN}$ and $F(\phi_{MAX})=\beta_{MAX}$. This optimized situation is illustrated by curve 42 in FIG. 4B. For sake of clarity, $\beta_{MIN}$ is shown as being larger than 0 while $\beta_{MAX}$ is shown as being smaller than 1, but it is noted that this is not intended to restrict the invention as it may be that $\beta_{MIN}=0$ and/or $\beta_{MAX}=1$.

In an exemplary implementation, the function F is a linear function defined by two coefficients C1 and C2 according to the formula $\beta=C1\cdot\phi+C2$. It should be clear to a person skilled in the art that in such case the two coefficients C1 and C2 can be calculated as $$C1=(\beta_{MAX}-\beta_{MIN})/(\phi_{MAX}-\phi_{MIN}) \text{ and } C2=\beta_{MIN}-C1\cdot\phi_{MIN}$$

If the memory 39 contains a look-up table, the new entries in the look-up table may be calculated using the above function F.

Normally, as mentioned before, the function F is a more complicated function, but it any case it should be clear to a person skilled in the art how such function can be scaled such as to obtain $F(\phi_{MIN})=\beta_{MIN}$ and $F(\phi_{MAX})=\beta_{MAX}$.

It is to be noted that the memory 39 preferably is a non-volatile memory, so that the proper function F matching the current mains dimmer 1 is maintained even when the armature 20 is disconnected, or when the mains power fails.

Summarizing, the present invention provides a driver 32 for a solid state lamp 31 receives phase-cut AV supply voltage PCACV. The lamp is operated at a dimmed light output $L_A$ on the basis of the phase angle $\phi$ of the phase-cut AV supply voltage PCACV. The driver comprises a memory 39 containing information defining a function F.

In a normal mode, the driver monitors the supply voltage and calculates the momentary value of the dim factor $\beta$ from the momentary value of the phase angle $\phi$ according to a formula $$\beta=F\phi$$

In a learning mode, the driver detects the lowest value $\phi_{MIN}$ and the highest value $\phi_{MAX}$ assumed by the phase angle $\phi$, and updates the said information in said memory 39 such that the dim factor will have its minimum value and maximum value $\beta_{MIN}$, $\beta_{MAX}$ corresponding to the minimum value and maximum value $\phi_{MIN}$, $\phi_{MAX}$ of the phase angle $\phi$, respectively.

As a result, the lamp driver always provides minimum output power when the mains voltage has the minimum phase angle $\phi_{MIN}$ and always provides maximum output power when the mains voltage has the maximum phase angle $\phi_{MAX}$.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims. For instance, the dimmer may be associated with the lamp armature.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. A driver for a solid state lamp having a nominal rating corresponding to a nominal light output, the driver having output terminals for connection to the lamp and having input terminals for receiving phase-cut AV supply voltage;
   wherein the driver is configured to generate at its output terminals a lamp current for the lamp such that the lamp is operated at a dimmed light output with a dim factor within a range between a minimum value and a maximum value on the basis of the phase angle of the phase-cut AV supply voltage; wherein the driver comprises a memory containing information defining a function;
   wherein the driver is capable of operating in a normal mode in which the driver is configured to monitor the supply voltage received at its input terminals to detect the momentary value of the phase angle, and to calculate the momentary value of the dim factor from the momentary value of the phase angle according to a formula, in which
   $\beta$ indicates the dim factor,
   $\phi$ indicates the phase angle, and F indicates said function defined by information in said memory;
   wherein the driver is capable of operating in a learning mode in which the driver is configured:
   to monitor the supply voltage received at its input terminals
   to detect the momentary value of the phase angle,
   to detect the lowest value assumed by the phase angle,
   to detect the highest value assumed by the phase angle,
   and to update the said information in said memory such that the momentary value of the dim factor calculated from the momentary value of the phase angle according to said formula is equal to the minimum value when the phase angle has it minimum value and is equal to the maximum value when the phase angle has it maximum value.

2. The driver of claim 1, wherein the driver is configured to monitor the phase-cut AC supply voltage received at input terminals continuously.

3. The driver of claim 1, wherein the driver is configured to monitor the phase-cut AC supply voltage received at the input terminals at predetermined time intervals.

4. The driver of claim 1, wherein the function F is a linear function, defined by two coefficients C1 and C2.

5. The driver of claim 1, wherein the function F is a non-linear function, adapted to compensate for the sensitivity characteristics of the human eye.

6. The driver of claim 1, wherein said minimum value ($\beta_{MIN}$) is equal to 0 and/or wherein said maximum value ($\beta_{MAX}$) is equal to 1.

7. The driver of claim 1, wherein the driver is configured to make a transition from the normal mode to the learning mode in response to detecting a specific command code contained in the phase-cut AC supply voltage.

8. The driver of claim 7, wherein the driver is configured to make a transition from the normal mode to the learning mode in response to detecting a rapid sequence of alternating high and low settings of the phase angle ($\phi$).

9. The driver of claim 1, wherein the driver is configured to make a transition from the learning mode to the normal mode after having been operating in the learning mode for a predetermined length of time.

10. The driver of claim 1, wherein the driver is configured to make a transition from the learning mode to the normal mode in response to detecting a specific command code contained in the phase-cut AC supply voltage.

11. the driver according to claim 10, wherein the driver is configured to make a transition from its learning mode to its normal mode in response to detecting the phase angle ($\phi$) remaining constant for a predetermined length of time.

12. A method of operating a driver for a solid state lamp having a nominal rating corresponding to a nominal light output, the driver having output terminals for connection to the lamp and having input terminals for receiving phase-cut AV supply voltage;
wherein the driver is configured to generate at its output terminals a lamp current for the lamp such that the lamp is operated at a dimmed light output with a dim factor within a range between a minimum value and a maximum value on the basis of the phase angle of the phase-cut AV supply voltage; wherein the driver comprises a memory containing information defining a function;
wherein the driver is capable of operating in a normal mode in which the driver is configured to monitor the supply voltage received at its input terminals to detect the momentary value of the phase angle, and to calculate the momentary value of the dim factor from the momentary value of the phase angle according to a formula, in which $\beta$ indicates the dim factor,
$\phi$ indicates the phase angle, and F indicates said function defined by information in said memory;
wherein the driver is capable of operating in a learning mode in which the driver is configured:
to monitor the supply voltage received at its input terminals
to detect the momentary value of the phase angle,
to detect the lowest value assumed by the phase angle,
to detect the highest value assumed by the phase angle,
and to update the said information in said memory such that the momentary value of the dim factor calculated from the momentary value of the phase angle according to said formula is equal to the minimum value when the phase angle has it minimum value and is equal to the maximum value when the phase angle has it maximum value.

13. The method of claim 12, wherein the function F is a linear function, defined by two coefficients C1 and C2.

14. The method of claim 12, wherein the function F is a non-linear function, adapted to compensate for the sensitivity characteristics of the human eye.

15. The method of claim 12, wherein the minimum value ($\beta_{MIN}$) is equal to 0 and/or wherein the maximum value ($\beta_{MAX}$) is equal to 1.

16. The method of claim 12, wherein the driver makes a transition from the normal mode to the learning mode in response to detecting a specific command code contained in the supply voltage.

17. The method of claim 12, wherein the driver makes a transition from the normal mode to the learning mode in response to detecting a rapid sequence of alternating high and low settings of the phase angle ($\phi$).

18. The method of claim 12, wherein the driver makes a transition from the learning mode to the normal mode after having been operating in the learning mode for a predetermined length of time.

19. The method of claim 12, wherein the driver makes a transition from the learning mode to the normal mode in response to detecting a specific command code contained in the supply voltage.

20. The method of claim 12, wherein the driver is configured to make a transition from its learning mode to its normal mode in response to detecting the phase angle ($\phi$) remaining constant for a predetermined length of time.

* * * * *